May 25, 1965 E. C. MAURER 3,185,246
SEAT BELT ANCHORS
Filed Jan. 21, 1963 2 Sheets-Sheet 1
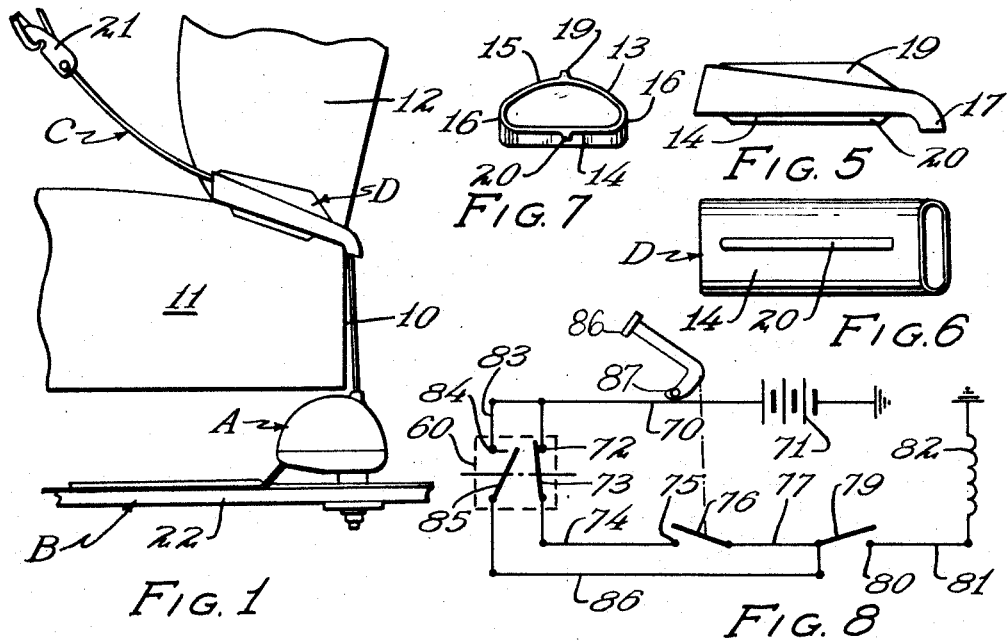
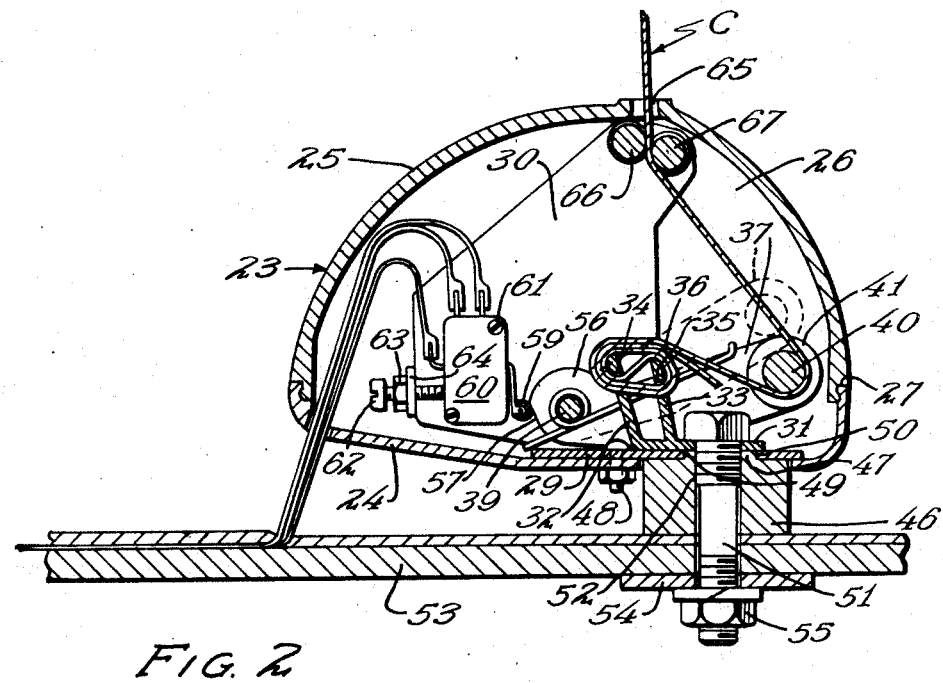
INVENTOR.
EDWARD C. MAURER
BY
Robert M. Dunning
ATTORNEY May 25, 1965  E. C. MAURER  3,185,246
SEAT BELT ANCHORS Filed Jan. 21, 1963  2 Sheets-Sheet 2

INVENTOR
EDWARD C. MAURER
BY
ATTORNEY

United States Patent Office 3,185,246
Patented May 25, 1965

3,185,246
SEAT BELT ANCHORS
Edward C. Maurer, 746 E. 7th St., St. Paul, Minn.
Filed Jan. 21, 1963, Ser. No. 252,829
8 Claims. (Cl. 180—82)

This invention relates to an improvement in seat belt anchors and deals particularly with a means of anchoring one end of a seat belt so that the vehicle cannot be driven unless the seat belt is fastened.

During the past few years considerable stress has been placed upon the desirability of using seat belts in automobiles. In certain States of the United States, the installation of seat belts on new automobiles has been made mandatory. Tabulations of the Public Health and National Safety Council statistics show that as many as thirty-eight thousand persons are killed while a million and a quarter people are injured. Of these, about one hundred fifty thousand a year are totally incapacitated. The property damage has been as high as over five billion dollars. It has been shown that a good number of serious accidents may be avoided by the proper use of seat belts, and each year more and more are being installed.

One of the biggest problems in conjunction with seat belts lies in the fact that the motorists are very likely to ignore them, and will not fasten them even where they are available. Even in States where the installation of such belts are mandatory, it has been found extremely difficult to force the riders to use the belts, particularly where the distance to be traveled is relatively short. Fleet owners who require the installation of seat belts on the cars which they own often find that serious accidents still occur and that in many instances the belts are not fastened at the time of the accidents. It is an object of the present invention to provide a means of insuring the use of the belts while driving.

Efforts have previously been made to solve the problem by wiring the belts so that the vehicle ignition circuit, or a suitable alarm signal may be controlled by the fastening of the belt. However, there has been serious objection to having the ignition current running through the belt, and the constant flexing of the belt and conductors creates a likelihood of inadvertently breaking the ignition circuit. It is an object of the present invention to provide a means of anchoring one end of a two-part belt through a housing enclosing a switch which is actuated by a predetermined belt tension. This belt tension is relatively light, and does not affect the comfort of the driver or cause undue strain upon the body. At the same time, once the seat belt is in place, the car may be driven in the customary manner.

Another of the difficulties often experienced through the use of seat belts lies in the fact that when they are used, they are oftentimes not tightened sufficiently to eliminate the danger of injury to the user in the event of an accident. Due to the fact that the present device requires a slight tension in the belt in order to operate, the present device avoids this previous difficulty.

A further feature of the present invention resides in the provision of a belt anchor which incorporates a switch capable of functioning when but slight tension is placed on the belt, and yet at the same time permits a certain amount of stretching of the belt to compensate for movements of the body. As long as the portion of the body encircled by the belt is under slight tension, the ignition circuit may remain closed, and the switch cannot accidentally open the ignition circuit if the belt is properly applied. At the same time, the driver may shift in position and the belt will yield upon changes in position to prevent any danger of binding.

A further feature of the present invention resides in the fact that in the preferred form of installation, the vehicle may be started and the engine may be run without the seat belt being in place as long as the vehicle remains stationary. A switch is provided controlled by the emergency brake which may be used in a parallel circuit to the ignition system. In other words, a first circuit may include the brake actuated switch so that the ignition circuit may be closed as long as the emergency brake is set. A second parallel circuit may be provided to the seat belt anchor switch which may also maintain the ignition circuit closed as long as the seat belt is under slight tension.

An added feature of the present invention provides in the provision of a seat anchor which includes a tension control device which kinks the belt or forms an angular bend in the belt when the belt is slack. This tension controller is pivotally supported so that as the tension in the belt increases, the size of the fold decreases until the belt extends on a straight line from its point of anchorage to the point where it leaves the anchor housing. As a result, in the event of an accident, both ends of the belt are firmly anchored.

A further feature of the present invention resides in the provision of a guide tube designed to guide the belt between the seat cushion and the seat back, thereby eliminating most of the resistance to the slidable movement of the belt between the seat and back. With this arrangement, a predetermined pull on the belt will create a predetermined tension and the belt will not be prevented from operation due to undue friction upon the surface of the belt.

These and other objects and novel features of the present invention will be more clearly and fully set forth in the following specification and claims.

In the drawings forming a part of the specification:

FIGURE 1 is a diagrammatic view showing the relative position of the seat anchor and the seat.

FIGURE 2 is a vertical sectional view through the seat anchor, showing the arrangement of parts therein.

FIGURE 5 is a side elevational view of the guide tube used in conjunction with the belt anchor.

FIGURE 6 is a bottom plan view of the guide tube illustrated in FIGURE 5.

FIGURE 7 is an end view of the tube illustrated in FIGURES 5 and 6.

FIGURE 8 is a diagrammatic view of the wiring of the apparatus.

Figure 3:
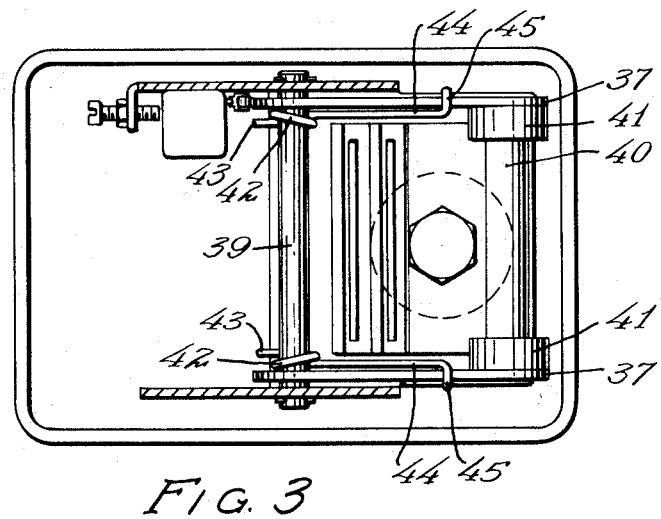
FIGURE 3 is a top plan view of the seat belt anchor with the top of the casing and the seat belt strap removed therefrom.
Figure 4:
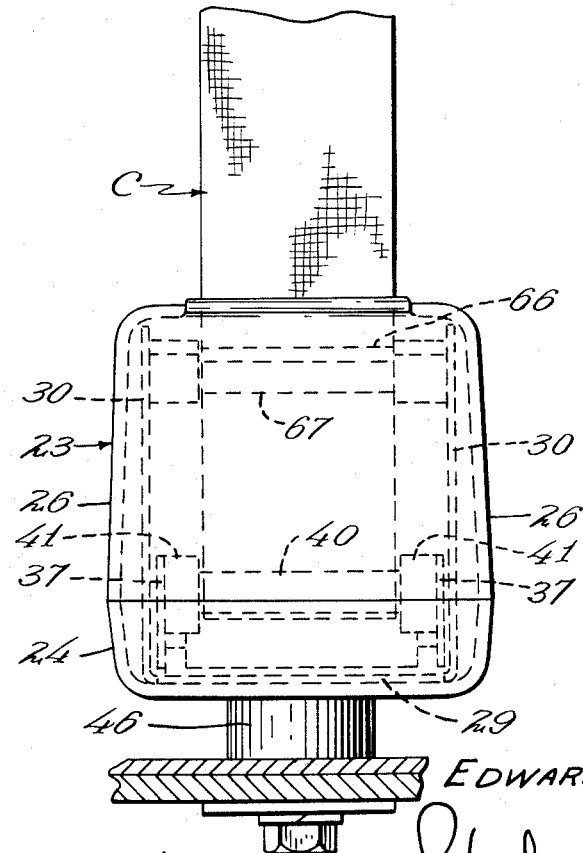
FIGURE 4 is an end elevational view of the anchor.

The seat belt C is mounted within an automobile or similar vehicle which is indicated in general by the letter B. The control A is preferably mounted below the rear edge 10 of the vehicle seat 11 so that the seat belt C may extend upwardly to the rear of the seat cushion. An angular tube D is inserted between the seat cushion 11 and the seat back 12 and serves as a guide for the seat belt C so that the seat belt will not bind against the cushions or the passage between the cushions.

For the purpose of description, the tube D comprises an elongated tapered tube 13 having a substantially flat bottom 14 and an upwardly bowed top portion 15 connected by smoothly curved sides 16. The rear end of the tube at the smaller dimensioned end of the tube structure is bent downwardly as indicated at 17, the end of the downwardly bent portion 17 being substantially at right angles to the tube bottom 14. Longitudinally extending vanes 19 and 20 extend upwardly and downwardly from the horizontal portion of the tube, the purpose of these vanes being to prevent the tube from twisting laterally during use. As the tubular structure is slightly wider than the belt C, the belt will slide through the tube with a minimum of friction.

The seat belt C is not illustrated in detail, as it may comprise any desired type of belt formed in two portions which are connected by an adjustable buckle. The buckle is diagrammatically illustrated at 21 in FIGURE 1 of the drawing. The end of the belt which is not illustrated in the drawings usually extends between the seat cushion 11 and seat back 12 and is anchored to the floor 22 of the vehicle by any suitable conventional anchoring means.

The control A is enclosed within a housing 23 which may include a generally flat bottom section 24 and a dome-shaped top section 25 extending between substantially parallel sides 26. The upper section 25 is removable from the bottom section along the parting line 27 and the two sections may be frictionally engaged or held connected in any suitable manner.

The housing 23 is provided with a base plate 29 which supports a pair of spaced parallel side plates 30 which extend upwardly to a point adjacent the top of the upper housing section 25. Overlying the base plate 29 is provided an anchoring plate 31 having a pair of upwardly and forwardly extending flanges 32 and 33 integrally attached thereto. The flanges 32 and 33 are provided with transverse slots 34 and 35 through which the end 36 of the seat belt C is threaded and anchored in an approved manner. FIGURE 2 shows one manner of anchoring the seat belt, but obviously this can be varied without changing the present invention.

A pair of parallel arms 37 are pivotally supported on a transverse pivot shaft 39 supported at opposite ends by the side plates 30. The free ends of the arms 37 are connected by a shaft 40 which preferably includes collars or enlarged diameter end portions 41 which are spaced apart a distance substantially equal to the width of the belt C. As a result, these enlarged diameter end portions 41 serve as a belt guide to maintain the belt centered. A spring 42 is coiled about each end of the pivot shaft 39, and is provided with one end 43 which bears against the base plate 29, and a second end 44, which extends generally parallel to the adjoining arm 37, the extremity of each spring arm 44 being hooked over the adjoining arm 37 as indicated at 45. The springs 42 tend to rotate the arms 37 in a clockwise direction as viewed in FIGURE 2 to apply tension to the belt as will be later described.

The base plate 29 is supported by a cylindrical block or support 46 having a reduced diameter projection 47 extending through an aperture 49 in the base plate 29. The projection 47 is preferably staked or otherwise connected to the base plate. The anchoring plate is apertured as indicated at 50, this aperture being aligned with an internally threaded bore 52 in the supporting block 46. A bolt 51 is arranged with its head overlaying the anchoring plate 31 and the upper portion of the bolt shank is threaded into the bore 52 to hold these parts assembled. The bolt 51 is of sufficient length to extend through the vehicle floor and body frame indicated at 53 and through a reinforcing plate 54. The bolt serves to hold the base plate connected to the floor and frame by means of a nut 55. Bolts such as 48 serve to connect the lower portion 24 to the base plate 29. The support 47 may be eliminated if the housing is to be mounted directly upon the car floor.

As indicated in FIGURE 2 of the drawings, one of the plates 37 is provided with an enlarged end 56 which is irregularly cut as indicated at 57 to form a cam. The cam 57 is engaged by the cam roller 59 projecting from the body of a double pole, single throw switch 60. The housing of the switch 60 is supported by a pivot bolt 61 mounted on one of the side plates 30 or extending therethrough. An adjustment bolt 62 provided with a lock nut 63 extends through a laterally projecting ear 64 on said one side plate 30 and provides a means of swinging the switch 60 toward or away from the cam 56.

The top 25 of the casing 23 is transversely slotted as indicated at 65, and a pair of spaced guide rollers 66 and 67 are rotatably supported between the parallel side plates 30. The belt C is trained around the shaft 40 between the collars or rollers 41 and between the guide rollers 66 and 67 which are located directly above the point of anchorage of the belt end 36. Thus when sufficient tension is applied to the belt C, the belt may extend in a direct line from the point of anchorage between the guide rollers 66 and 67, and through the slot 65.

As indicated in FIGURE 8 of the drawings, the power line or conductor 70 extends from the battery 71 or other current supply source to the fixed terminal 72 of the normally closed switch arm 73 forming a part of the switch 60. The switch arm 73 is connected by conductor 74 to the fixed terminal 75 of the switch 76 which is actuated by the emergency brake, the switch 76 being closed when the emergency brake is set. When this brake is released, the switch arm 76 automatically opens. The switch 76 is connected by conductor 77 through the ignition switch 79, the other terminal 80 of which is connected by a conductor 81 to the coil illustrated diagrammatically by the numeral 82. The portion of the ignition circuit between the switch 79 and the second terminal of the battery 71 is not shown in detail as this circuit is well known in the art. As will be understood, the coil 82 generates the frequency current used in the ignition system.

The circuit shown in FIGURE 8 also shows a second circuit portion which is in shunt relation to the normally closed switch 73 and emergency brake switch 76. This circuit extends from the battery 71 through the conductor 70 and the conductor 83 to the fixed terminal 84 of the normally open switch 85. The other terminal of the switch 85 is connected by conductor 86 to the ignition switch 79. The switch arm 85 forms a part of the double pole, single throw switch 60 which is embodied in the belt anchor housing 23.

The operation of the device is believed generally evident from the foregoing description. When the belt C is not under tension, the arms 37 are in the position shown in full lines in FIGURE 2 of the drawings, and the switch arm 73 is closed and the switch arm 85 is open. If it is desired to start the car with the belt unfastened, this may be done as long as the emergency brake is set, closing the switch 76. The emergency brake 86, pivoted at 87, is diagrammatically shown in FIGURE 8 in released position. The ignition switch may be closed and the circuit to the ignition system is complete. Obviously, however, if the emergency brake is released, the motor will stop. In order to drive the vehicle, it is necessary for the operator to fasten the seat belt, the belt being under sufficient tension to swing the arms 37 an angular distance of perhaps ten degrees or into the position indicated in dotted outline in FIGURE 2. As long sufficient tension is applied to the belt to maintain the arms 37 in the position shown in dotted outline or in any further degree of angularity from the inoperative position, the ignition circuit may be closed by the ignition switch. Once the seat belt has been tightened with the driver in proper position, the switch 60 cannot readily be actuated without opening the seat belt. At the same time, the driver may change position or move about in a normal manner, added tension on the seat belt merely reducing the kink or fold in the belt between its point of anchorage and the guide rollers 66 and 67. When maximum tension is applied to the belt, the belt will extend directly from the point of anchorage to the guide rollers and will no longer be subject to flexing.

In accordance with the patent statutes I have described the principles of construction and operation of this improvement in seat belt anchors, and while I have endeavored to set forth the best embodiment thereof, I desire to have it understood that changes may be made within the scope of the following claims without departing from the spirit of my invention.

I claim:

1. A seat belt anchor for use in securing an end of a seat belt to the body of an automotive vehicle having an internal combustion engine controlled by an ignition system, the anchor including a housing,
means for securing said housing adjacent to the floor of the vehicle,
a two part seat belt having an end anchored to said body and the other end secured within said housing,
a switch in said housing associated with said seat belt, and normally open to break a circuit therethrough,
switch actuating means engaging said belt and closing said switch when said belt is under tension, and
a circuit including a power source, said switch, an ignition switch and said ignition system.

2. The structure of claim 1 and in which said switch actuated means includes an arm hingedly supported in said housing, and
means normally urging said arm in a direction to kink the belt, whereby
when said belt is subjected to tension the belt will straighten out said kinked portion and actuate said switch in said housing.

3. A seat belt anchor arrangement adapted to control a vehicle ignition system and including,
a hollow housing having a base portion adapted to be connected to the floor of the vehicle,
a belt strap having an end anchored within said housing adjoining the base portion thereof,
the side of said housing opposite said base portion having a slot through which said belt strap extends,
an arm pivotally secured in said housing on an axis generaly parallel to the surface of the belt strap and having a free end engaging the belt strap between said anchored end and said slot,
resilient means urging said arm against said belt to kink said belt out of a straight line between the anchored end and the slot and
a normally open switch actuated by pivotal movement of said arm when tension on said belt tends to straighten out said kinked portion.

4. The structure of claim 3 and including a cam rotatable with said arm and engaging said switch to actuate the same upon pivotal movement of said arm.

5. In combination,
an automotive vehicle having an electrically controlled power unit, an emergency brake, and a switch for controlling said power unit,
a normally open switch associated with said brake and closed when said brake is set,
a seat belt anchor including a normally open switch and a normally closed switch simultaneously operable when tension is applied to the belt,
a first circuit including a current source, said normally closed switch, said brake actuated switch and said power unit switch and said power unit, and
a second circuit including a current source, said normally open switch in said seat belt anchor, said power unit switch and said power unit,
whereby the power unit may be operated when either of said circuits is completed.

6. A seat belt anchor arrangement for use in combination with an automobile having an electrically controlled power unit, and a switch controlling said power unit, the anchor including
a hollow housing having a base portion adapted to be connected to the floor of said automobile,
a seat belt having a belt end anchored within said housing adjoining the base portion thereof,
the top of said housing having a slot through which said seat belt extends,
means within said housing resiliently urged against said belt between said slot and the anchored belt end, said means flexing said belt out of a straight line between said slot and said anchor.
a normally open switch in said housing actuated by the flexing of said belt toward a straight line between said anchored end and said slot when tension is applied to the belt, and
a circuit including a current source, both said switches, and the power unit.

7. In combination,
an automotive vehicle having an internal combustion engine controlled by an ignition system including an ignition switch, and an emergency brake,
a normally open switch associated with said brake and closed when said emergency brake is set,
a seat belt anchor,
a seat belt attached thereto,
a switch including a normally open switch element and a normally closed switch element secured adjacent to said belt and simultaneously operable when tension is applied to said belt to close said normally open switch element and to open said normally closed switch element, said switch being secured adjacent to said anchor and operably engaged with said belt,
a first circuit including a power source, said normally closed switch element, said brake actuated switch, said ignition switch, and the ignition circuit, and
a second circuit including the power source, said normally open switch element, said ignition switch and said ignition circuit,
whereby the operation of said engine is dependent upon the setting of the emergency brake or the securing of said seat belt.

8. A seat belt anchor arrangement including,
a hollow enclosure of a width greater than the width of the seat belt,
said enclosure including a slot through which a portion of the seat belt may extend,
means for anchoring an end of the seat belt in fixed relation to said enclosure,
an arm pivotally supported within said housing and including a shaft extending parallel to a surface of said seat belt and engaging said surface,
said arm being pivotal from a first position in which said belt may assume a substantially straight path from said slot to said anchoring means to a second position in which said belt is bent into a generally V-shaped form between said slot and said anchoring means,
means normally biasing said arm toward said second position, and
switch means actuated by movement of said arm from said second position toward said first position.

References Cited by the Examiner
UNITED STATES PATENTS

| 1,725,469 | 8/29 | Millingar et al. | 200—61.18 |
| 1,937,061 | 11/33 | Jewell | 200—61.18 |
| 2,659,018 | 11/53 | Harrison | 180—82 X |
| 2,740,947 | 4/56 | Davies | 180—82 X |
| 2,802,073 | 8/57 | Simon | 180—82 X |
| 2,861,627 | 11/58 | Smith. | |
| 2,868,309 | 1/59 | Burgess | 180—82 |
| 3,092,696 | 6/63 | Wallace | 200—61.18 |

FOREIGN PATENTS

| 231,094 | 6/59 | Australia. |

A. HARRY LEVY, *Primary Examiner.*